April 8, 1969   J. A. PATTERSON   3,437,266
CENTRIFUGAL SEPARATION ENHANCEMENT
Filed July 3, 1967
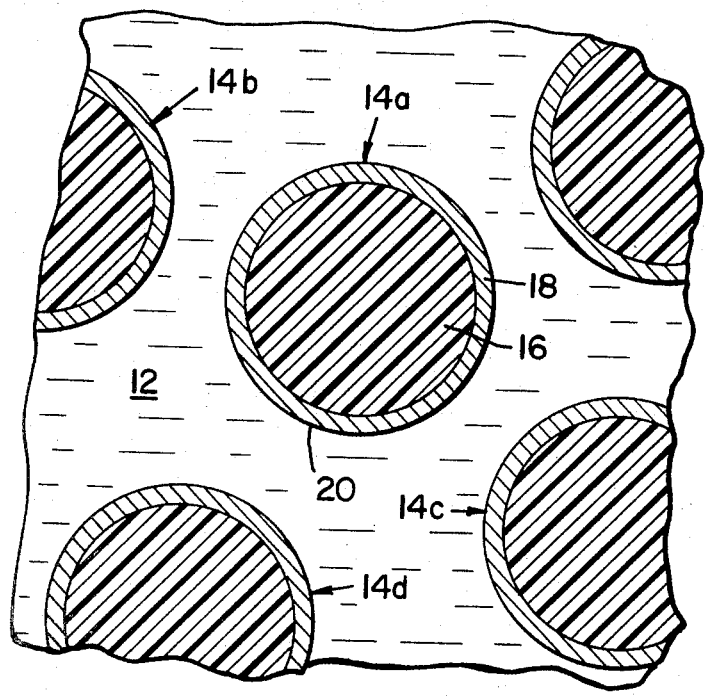
FIG_1
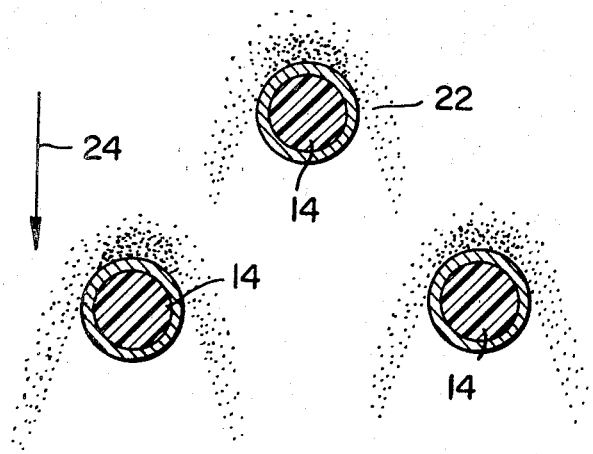
FIG_2
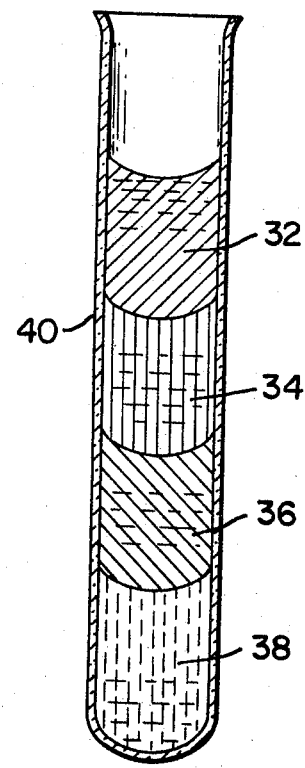
FIG_3
INVENTOR.
JAMES A. PATTERSON
BY
Townsend and Townsend
ATTORNEYS

United States Patent Office 3,437,266
Patented Apr. 8, 1969

3,437,266
CENTRIFUGAL SEPARATION ENHANCEMENT
James A. Patterson, Los Altos, Calif., assignor to Sondell Research & Development Company, Palo Alto, Calif., a corporation of California
Filed July 3, 1967, Ser. No. 650,941
Int. Cl. B04b 3/00; B01d 33/00, 33/02
U.S. Cl. 233—1
6 Claims

ABSTRACT OF THE DISCLOSURE

A centrifugation method employing manufactured spheres of prescribed densities. A gradient fraction column formed by manufactured spherical bodies having appropriate densities. Manufactured spheres for density marking each of which spheres has a color or hue indicative of its density.

---

This invention relates to the art of separating for analysis, material of different densities by centrifugation, and more particularly to employment of a large plurality of microspherical bodies having selected densities for addition to the material to be centrifuged both to expedite centrifugal separation and/or to provide a visual indication of the degree of separation accomplished.

The art of separation of materials having different densities by centrifugation is well established and has found particular application in analysis of biological fluids such as blood. Addition of particulate matter to such materials for expediting centrifugal separation of the constituents thereof has afforded significant improvements in analysis by this technique. For example, in U.S. Patent No. 2,271,501, the addition of minute particles of barium sulfate has been disclosed, and in U.S. Patent No. 3,075,694, the addition of starch particles to the fluid has been disclosed. The cited disclosures have added much of value to the art of centrifugation; the present invention eliminates certain disadvantages inherent in the prior art techniques and in so doing further enhances the value of centrifugal techniques in separation and analysis of fluid substances.

The present invention provides a medium for addition to a substance to be analyzed by centrifugal techniques which medium is composed of a large plurality of manufactured spherical bodies that have such small diameters that they can be termed microspheres. Such microspheres afford all the advantages of the prior art techniques to which reference has been made hereinabove, and overcome certain shortcomings in the prior art technique. Moreover, certain analytical procedures not possible heretofore can be accomplished in accordance with the present invention. The microspheres employed in practicing the present invention each includes a spherical core of resinous material on which is coated a layer of metallic material. The metallic material has a much greater density than the core material so that, by variation of the thickness of the metallic material relative to the diameter of the spherical core, the composite density of the microspheres can be precisely controlled. Additionally, the material of which the core is made, although of relatively low density, has great resistance to compressive forces so that when the spheres are utilized in the presence of a centrifugal force field of large magnitude, they will not be substantially distorted or destroyed. The metallic coating is of a material that is chemically inert to the materials being processed by the centrifugal technique so that the results secured from the centrifugal process will be accurate and so that the microspheres constituting the medium can be reused.

For the purpose of the present specification and appended claims the term "microspheres" means a spherical or a substantially spherical body having a diameter of from about 10 microns, $\mu$(1 micron=.001 millimeter), to about 10 millimeters (mm.). Such spheres with or without metal coating thereon are available from Sondell Research and Development Company, Palo Alto, Calif.

The principal object of the present invention is to provide a medium for addition to a fluid substance in conjunction with subjecting the fluid substance to a centrifugal force field. The medium is composed of a great plurality of microspheres having precisely controlled and preselected density or densities so as to expedite centrifugal separation and analysis of the fluid substance. This object is achieved by providing manufactured, as contrasted with naturally occurring, particles which are of composite construction so that their overall or composite density is precisely established in respect to the densities of the constituents of the fluid under analytical investigation.

Another object is to provide such medium wherein the particles forming the medium are entirely non-occluded or convex so as to avoid interference with the centrifugation process. This object is achieved by forming both the core and the outer layer of the microspheres in a perfect or substantially perfect spherical form so that the external surface is convex and non-occluded.

A further object is to provide a medium that is inert to the fluid materials to which it is added. Such object is accomplished by providing composite microspheres having a core of one material, a heavy metallic layer of another material, and a protective plastic layer on the outside surface. The material of which the outer layer is formed can be selected from a large group of suitable materials so as to achieve the quality of chemical inertness to the fluid under centrifugal treatment.

A still further object of the present invention is to provide a medium for addition to a fluid substance prior to centrifugal treatment of such substance which medium provides a visual indication of the state and degree of separation of the various constituents of the fluid. This object is acheived in the present invention by providing each sphere with a color coating that has a hue corresponding to the density of the material. Thus, when a fluid material and the medium of the present invention have been centrifugally treated, the various density ingredients in the material will be visible because the spheres will organize themselves in proportion to the density of the fluid material.

A feature and advantage of the present invention is that the interstitial space between the spheres is accurately predictable, since the spheres are virtually 100% spherical. Accordingly, a known volume of fluid can be expanded with great precision by addition of an appropriate number of spheres to such volume. The spheres are chosen to have a density equal to the fluid in the volume so that in a centrifugal force field, no relative movement between the fluid and the spheres will exist. When the centrifugal force is terminated, capillary force will retain the fluid within the interstitial space and prevent recombination of the separated constituents.

The foregoing objects, features, and advantages of the present invention together with others will be more apparent upon referring to the following specification and accompanying drawings in which:

FIG. 1 is a cross-sectional view at greatly enlarged scale of a segment of the medium of the present invention;

FIG. 2 is a schematic diagram illustrating an accepted theoretical mechanism by which the medium of the invention enhances centrifugal separation; and FIG. 3 is a view of a container in which a fluid material including the medium of the present invention has been separated into its constituent components by centrifugation.

Referring more particularly to the drawings, reference numeral 12 indicates at greatly enlarged scale a fluid material in which is placed the medium of the present invention exemplified in the drawing by microspheres 14a, 14b, 14c, and 14d. Because the spheres are substantially identical, a detailed description of sphere 14a will suffice to illustrate and exemplify the elements of the medium of the present invention. Microsphere 14a includes a core 16 formed of resinous material such as styrene, cross-linked with divinyl benzene. Intimately bonded to the outer surface of core 16 is a metallic coating 18 of material that has a density with respect to the material being treated and with respect to the density of core 16 such that the composite density of each microsphere can be established at the desired magnitude. Materials such as gold, copper, nickel, silver, cobalt and iron, which have well known chemical and density characteristics, can be employed in forming metallic coating 18. On the exterior surface of coating 18 can be placed for identification a colored layer 20 formed of insignificant weight and thickness of suitable lithographic ink or dye which is set and hardened by first applying ink or dye and then baking the entire structure sufficiently to set the ink and bond it to metallic layer 18.

The composite density of microsphere 14a can be established during manufacture of the microspheres by properly establishing the thickness of metallic coating 18, as well as the material of which the metallic coaating is formed, with respect to the diameter and density of core 16.

For example, in one system of density markers made according to the present invention, spheres of six different composite densities are provided. These densities are as follows: 1.1; 1.2; 1.3; 1.4; 1.5; and 1.6 grams per cubic centimeter ($gm./cm.^3$). The spheres have a diameter of approximately 800 microns, a diameter large enough to be visible but small enough to avoid interfering with the efficent centrifugal separation of the liquid material. The exemplary spheres are formed with a polymer core of material having a density of 1.056 $gm./cm.^3$ are coated with a metal having a density of 7.80 $gm./cm.^3$. The relationship between the composite density of the sphere, the specific densities of the core and coating material, and the diameter of the sphere and thickness of the metal layer is as follows:

$$D = \frac{R_p^3}{R_m^3}(D_p - D_m) + D_m$$

In the foregoing equation:
D is composite density of the coated sphere;
$D_m$ is density of the metal coating;
$D_p$ is density of the polymer core;
$R_p$ is radius of the polymer core; and
$R_m$ is radius of the metal coating.

In accordance with the foregoing formula, if a sphere having a density of approximately 1.3 is desired, it is convenient to provide a polymer sphere having a density of 1.056 $gm./cm.^3$ and a diameter of about 840 microns. On such sphere is coated a metal having a desnity of approximately 7.80 $gm./cm.^3$ and a thickness equal to about 10 microns, i.e., $R_m$ equals 850 microns. It has been found that for each ten microns of diameter variation of the composite spheres, a variation in density of about .3 $gm./cm.^3$ is effected so that the various spheres are approximately, although not exactly, the same size.

In order to render the spheres suitable for a density gradient marker system, it is convenient to dye or otherwise color the spheres with different hues according to their densities. For this purpose such material as offset ink procured from the A. B. Dick Company of Chicago, Ill., has been found satisfactory. The ink is applied by placing the completed spheres together with a small quantity of the ink into a waterproof bag and then agitating the ink and spheres to coat the spheres uniformly with ink. The coated spheres are removed from the bag and baked or heat treated at about 120° C. Because the ink specified above has a plastic vehicle, the baking causes formation of a colored plastic coat which is sealed to the metal surface on the sphere so that the metal does not come into contact with the liquid material in which the spheres are placed. Additionally, the heat treatment sterilizes the spheres, further contributing to avoidance of contamination.

For more fully understanding the employment of the present invention, the following example of its use should be considered:

A homogenous mixture of cesium chloride solution, obtained from Westbay Specialties Company, Napa, Calif., and 0.1 ml. of 0.2% catalase, commercially available from Armour Pharmaceutical Labs., Illinois, was made up to a density of 1.24 $gm./cm.^3$. The solvent used was 0.1 M Tris Buffer pH 8.2.

Two centrifuge tubes were loaded with the cesium chloride-catalase mixture and a single tube was loaded with only cesium chloride. The volume in each tube was 5.2 ml. of solution and each had a density of 1.24 $gb./cm.^3$. Six spherical density markers 14 were placed in the tube loaded with the CsCl-catalase mixture and also in the tube loaded with only CsCl solution. No markers were placed in the second tube with the CsCl-catalase mixture. A Beckman Model L2–65 ultracentrifuge equipped with an SW65 rotor was employed. The three tubes were centrifuged at 65,000 r.p.m. for 160 hours at 5° C. to facilitate observation of the gradient distribution by the density markers and proper banding of the catalase in the CsCl solution.

After termination of centrifugation, the actual position of the spherical density markers in relation to their position in the banded catalase sample was observed. The tubes were then fractionated by puncturing the bottom and collecting the fractions. Each fraction was measured for refractive index by conventional refractometer procedures. Densities were calculated from the refractive indices obtained on the refractometer and such densities were found to correspond very closely with those calculated in accordance with the equation set forth hereinabove.

FIG. 2 illustrates separation of colloidal particles 22 by a centrifugal force field directed along arrow 24. As explained in Patent No. 3,075,694, the particles are concentrated adjacent the spheres by the force field. Because spheres 14 have smooth surfaces, the particles 22 are not captured by the spheres.

In practicing the invention according to the immediately preceding description and example, the number of spherical bodies is very small compared with the volume of fluid being centrifugally processed. Because each sphere is of sufficiently large size to be visible, a small number of spheres suffices to indicate the gradient boundaries. For enhancement of centrifugal processing of materials the present invention provides a column formed of packed spheres having various densities. Individual spheres of common density are organized into bands in a tube. The organization can be effected by placing the spheres, in a partially or preliminarily organized condition, into a density gradient liquid and centrifuging the resulting conglomeration for a time suitable to distribute the spheres according to their respective densities. When the spheres are so distributed, the gradient liquid is drained away or otherwise removed.

The parameters of a gradient fraction column formed according to the present invention are readily predictable and adjustable because the spheres are virtually ideal spheres, and it can be mathematically demonstrated that the interstices between the spheres in a tightly packed bed is equal to about 30% of the tottal volume. Therefore, if it be assumed that a given constituent of a fluid mixture would occupy a portion in a tube having a length of ten units without inclusion of spheres therein, such constituent would occupy a length along the same tube equal to about 33 units if an appropriate number of spheres having composite densities equal to that of the constituent were added to the fluid mixture. Thus, the volume occupied by a particular constituent in a liquid mixture can effectively be amplified or multiplied by employing the present invention, so that centrifugal separation and analysis of the liquid is enhanced.

Another advantageous characteristic of employing a packed gradient fraction column according to the present invention is that the constituents of a liquid mixture, once separated and disposed interstitially of the spheres, tend to remain there even after the centrifugal force field is removed. More complete separation can be effected because adequate time to draw off one fraction of a centrifugally separated liquid is available. The spheres that define the various regions of the column are preferably dyed different colors so that ascertainment of the density of the various regions can be accomplished visually. Such differential coloring is indicated in FIG. 3 wherein four density bands 32, 34, 36, and 38 are shown formed in a tube 40 by different colored spheres, the different colors being indicated in the drawing by different shading line patterns. Accordingly, one is apprised of the location and height of the various density zones.

Thus, it will be seen that the present invention provides substantial improvements in the art of centrifugal separation and analysis of liquids. Spheres utilized in practicing the invention have various advantageous characteristics which render them highly suitable for practicing the invention, which advantageous characteristics include the following: the spheres are inert with respect to the materials being tested; the spheres have no material-trapping concavities in their surfaces; the spheres have smooth surfaces so that they can readily move through a liquid and become organized according to the relative density of the spheres and the liquid; the spheres can readily be dyed or colored so as to afford ready identification of the specific density of a given sphere; the spheres can be manufactured to accurate size and density characteristics with a high degree of accuracy and reproducibility.

Although several embodiments of the invention have been shown and described, it will be obvious that other adaptations and modifications can be made without departing from the true spirit and scope of the invention.

What is claimed:

1. A density graded medium for use in centrifugal analysis of a fluid material that has a first constituent of first density and a second constituent of second density different from the first density, said medium comprising a plurality of bodies including solids microspherical cores of non-compressible resin having a density less than said first and second densities, each said core having on the surface thereof a continuous coating of metal of a density greater than said first and second densities, said plurality of bodies including a first group composed of bodies having sufficient metallic coating thereon that the composite density of each body in the first group is approximately equal to said first density and a second group composed of bodies having sufficient metallic coating thereon that the composite density of each body in the second group is approximately equal to said second density.

2. The invention of claim 1 wherein each said body is provided with a coating of plastic binder material that is substantially inert, said coating on the bodies of the first group being colored to a first hue and on the bodies of the second group being colored to a second hue visually distinct from said first hue.

3. The invention of claim 1 wherein the bodies of at least one of said groups are sufficient in number and are sufficiently packed that the interstitial volume is substantially equal to the volume of the constituent of corresponding density.

4. A density gradient marker body for use in centrifugation comprising at least one sphere having a first density, said sphere having coated thereon a metallic coating of material having a second density so that the composite density of said body is intermediate said first and second densities, said metallic coating being of a thickness such that the composite density of said body is that of the gradient being marked.

5. A method for enhancing separation of a liquid that has at least a first constituent and a second constituent of a density different from the first constituent comprising the steps of providing a first group of spheres having a density substantially equal to that of the first constituent and a second group of spheres having a density substantially equal to that of the second constituent, placing the spheres in the liquid, and applying a centrifugal field to the liquid for a time sufficient to distribute the spheres and liquid constituents according to their respective densities.

6. A method according to claim 5 wherein said providing step is further characterized by furnishing sufficient spheres that the interstitial volume among the spheres is substantially equal to the volume of the constituent of density corresponding to that of the spheres.

References Cited

UNITED STATES PATENTS

| 2,271,501 | 1/1942 | Scott | 233—1 |
| 3,075,694 | 1/1963 | Anderson | 233—1 X |

OTHER REFERENCES

"Sep-ar-aid," Lab. World, January 1965, p. 77.

WILLIAM I. PRICE, *Primary Examiner.*

U.S. Cl. X.R.

210—78, 361